US009086832B2

(12) United States Patent
Maekawa et al.

(10) Patent No.: US 9,086,832 B2
(45) Date of Patent: Jul. 21, 2015

(54) PRINTER (71) Applicant: BROTHER KOGYO KABUSHIKI KAISHA, Nagoya-shi, Aichi-ken (JP)

(72) Inventors: Yohei Maekawa, Nagoya (JP); Takeshi Miyake, Nagoya (JP); Munehisa Matsuda, Nagoya (JP); Yuki Yada, Kuwana (JP)

(73) Assignee: BROTHER KOGYO KABUSHIKI KAISHA, Nagoya-Shi, Aichi-Ken (JP)

( * ) Notice: Subject to any disclaimer, the term of this patent is extended or adjusted under 35 U.S.C. 154(b) by 0 days.

(21) Appl. No.: 14/276,284

(22) Filed: May 13, 2014

(65) Prior Publication Data

US 2014/0247459 A1 Sep. 4, 2014

Related U.S. Application Data

(63) Continuation of application No. 13/363,035, filed on Jan. 31, 2012, now Pat. No. 8,760,697.

(30) Foreign Application Priority Data

Mar. 11, 2011 (JP) .................. 2011-054433

(51) Int. Cl.
*G06K 15/00* (2006.01)
*G06F 3/12* (2006.01)
(52) U.S. Cl.
CPC .............. *G06F 3/1287* (2013.01); *G06F 3/122* (2013.01); *G06F 3/1205* (2013.01); *G06F 3/1208* (2013.01); *G06F 3/1238* (2013.01); *G06F 3/1253* (2013.01); *G06F 3/1267* (2013.01); *G06F 3/1288* (2013.01); *G06F 3/1265* (2013.01)

(58) Field of Classification Search
None
See application file for complete search history.

(56) References Cited

U.S. PATENT DOCUMENTS

| 6,201,611 | B1 | 3/2001 | Carter et al. |
|---|---|---|---|
| 6,515,756 | B1 | 2/2003 | Mastie et al. |
| 7,161,700 | B2 | 1/2007 | Nunokawa et al. |
| 7,286,251 | B2 | 10/2007 | Tomida et al. |

(Continued)

FOREIGN PATENT DOCUMENTS

| CN | 1217503 A | 5/1999 |
|---|---|---|
| EP | 1338952 A2 | 8/2003 |

(Continued)

OTHER PUBLICATIONS

Chinese Office Action issued in CN 201210021359.8, mailed May 21, 2014.

(Continued)

*Primary Examiner* — Satwant Singh
(74) *Attorney, Agent, or Firm* — Merchant & Gould PC (57) ABSTRACT

A printer may receive a predetermined notification from a print mediation server. The predetermined notification may be a notification to be sent to the printer by the print mediation server when the print mediation server has stored specific print data and specific condition data indicating a specific print condition to a storage unit according to an instruction from a terminal device. The printer may acquire the specific print data and the specific condition data from the storage unit in a case where the predetermined notification is received. The printer may cause a print executing unit to execute printing of an image represented by the specific data according to the specific print condition indicated by the specific condition data.

9 Claims, 5 Drawing Sheets

(56) References Cited

U.S. PATENT DOCUMENTS

| | | | |
|---|---|---|---|
| 7,365,872 | B2 | 4/2008 | Lawrence et al. |
| 7,408,659 | B2 | 8/2008 | Toda et al. |
| 7,619,766 | B2 * | 11/2009 | Tsuzuki .................. 358/1.15 |
| 7,916,323 | B2 | 3/2011 | Nishiguchi |
| 8,031,356 | B2 | 10/2011 | Cho |
| 8,233,177 | B2 | 7/2012 | Lawrence et al. |
| 8,310,709 | B2 | 11/2012 | Cho |
| 2002/0024686 | A1 | 2/2002 | Uchiyama et al. |
| 2002/0051194 | A1 | 5/2002 | Sakura |
| 2002/0178941 | A1 | 12/2002 | Mahoney et al. |
| 2003/0107762 | A1 | 6/2003 | Kinoshita et al. |
| 2004/0036903 | A1 | 2/2004 | Azami |
| 2004/0133636 | A1 * | 7/2004 | Kinoshita et al. ............. 709/203 |
| 2004/0205743 | A1 | 10/2004 | Sugahara |
| 2005/0270560 | A1 | 12/2005 | Ferlitsch |
| 2006/0028679 | A1 | 2/2006 | Uchiyama et al. |
| 2006/0028680 | A1 | 2/2006 | Uchiyama et al. |
| 2010/0060930 | A1 * | 3/2010 | Asai ..................... 358/1.15 |
| 2011/0242569 | A1 | 10/2011 | Ohara |
| 2012/0162681 | A1 | 6/2012 | Tomita |
| 2015/0002884 | A1 * | 1/2015 | Okumura et al. ............ 358/1.14 |
| 2015/0036170 | A1 * | 2/2015 | Miyake et al. ............... 358/1.14 |
| 2015/0036188 | A1 * | 2/2015 | Miyake et al. ............... 358/1.15 |
| 2015/0036189 | A1 * | 2/2015 | Shiraga et al. ............... 358/1.15 |
| 2015/0036191 | A1 * | 2/2015 | Suzuki et al. ............... 358/1.15 |

FOREIGN PATENT DOCUMENTS

| | | |
|---|---|---|
| JP | 2002-073462 A | 3/2002 |
| JP | 2003-216390 A | 7/2003 |
| JP | 2004-139158 A | 5/2004 |
| JP | 2005-182253 A | 7/2005 |
| JP | 2007-158867 A | 6/2007 |
| JP | 2007-230144 A | 9/2007 |
| JP | 2009-212653 A | 9/2009 |

OTHER PUBLICATIONS

Japanese Office Action issued in JP 2011-054433, dated Mar. 11, 2014.

European Patent Office, Extended European Search Report issued in EP 12153116.4, mailed Jul. 31, 2013.

Chinese Office Action issued in CN 201210021359.8, mailed Jan. 7, 2015.

Japanese Office Action issued in JP 2014-125038, mailed Apr. 7, 2015.

* cited by examiner

PRINTER

CROSS-REFERENCE TO RELATED APPLICATIONS

This application is a continuation of U.S. patent application Ser. No. 13/363,035 filed Jan. 31, 2012, and further claims priority to Japanese Patent Application No. 2011-054433, filed on Mar. 11, 2011, the contents of both of which are hereby incorporated by reference into the present application.

TECHNICAL FIELD

The technique disclosed in the present specification relates to a printer configured to be connected with a print mediation server through the Internet.

With a conventional system, a user inputs an ID of a document that is a print object into a terminal device. In this case, the terminal device transmits the ID to a print request administration server. The print request administration server transmits print request data including the ID to a facsimile server. In this case, the facsimile server acquires print data corresponding to the ID and transmits the print data to a printer. As a result, the printer executes printing according to the print data.

SUMMARY

There is a need for providing a user with an appropriate print result as desired by the user. The present specification discloses a technique that the user may be provided with the appropriate print result as desired by the user.

One technique disclosed in the present application is a printer. The printer may be configured to be connected with a print mediation server through the Internet. The printer may comprise a processor. The processor may operate as a receiving unit, a data acquiring unit, and a print control unit. The receiving unit may be configured to receive a predetermined notification from the print mediation server, wherein the predetermined notification may be a notification to be sent to the printer by the print mediation server when the print mediation server has stored specific print data and specific condition data indicating a specific print condition in a storage unit according to an instruction from a terminal device. The data acquiring unit may be configured to acquire the specific print data and the specific condition data from the storage unit in a case where the predetermined notification is received. The print control unit may be configured to cause a print executing unit to execute printing of an image represented by the specific print data according to the specific print condition indicated by the specific condition data.

Moreover, a method for realizing the printer is also novel and useful. In addition, a computer program for realizing the printer and a non-transitory computer readable storage medium that stores the computer program are also novel and useful.

BRIEF DESCRIPTION OF THE DRAWINGS

FIG. 5 shows a sequence diagram of an example of communication executed among respective devices when the power of the printer is turned on.

EMBODIMENT

System Configuration

Figure 1:
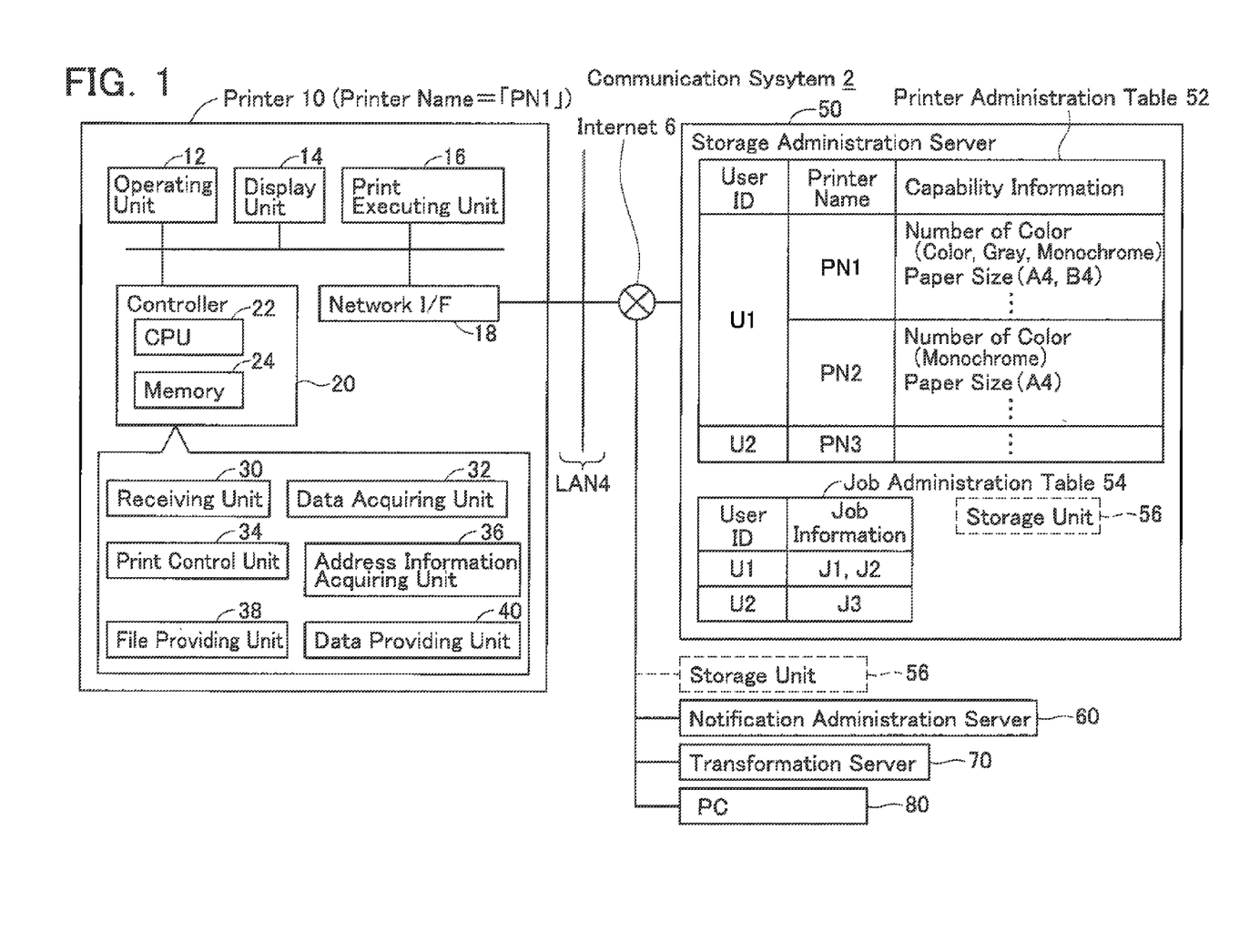
FIG. 1 shows an example of a configuration of a communication system.

As shown in FIG. 1, a communication system 2 comprises a printer 10 (a peripheral of a PC 80), a storage administration server 50, a notification administration server 60, and the PC 80. The respective devices 10 and 50 to 80 are separately configured. The printer 10 is connected to the Internet 6 through a LAN 4. The respective devices 50 to 80 are connected to the Internet 6. Therefore, the printer 10 is connected so as to be capable of communicating with the respective devices 50 to 80 through the Internet 6. Moreover, in a modification, the PC 80 may be connected to the LAN 4. In this case, the printer 10 is connected so as to be capable of communicating with the PC 80 through the LAN 4 instead of through the Internet 6.

Configuration of Printer 10

The printer 10 comprises an operating unit 12, a display unit 14, a print executing unit 16, a network interface 18, and a controller 20. The respective units 12 to 20 are connected to a bus line (reference numeral omitted). The operating unit 12 comprises a plurality of keys. By operating the operating unit 12, a user can input various instructions to the printer 10. The display unit 14 is a display for displaying various types of information. The print executing unit 16 comprises a printing mechanism adopting an inkjet head system, a laser system, or the like, and executes printing in accordance with an instruction from the controller 20. The network interface 18 is connected to the LAN 4.

The controller 20 comprises a CPU 22 and a memory 24. The CPU 22 executes various processes in accordance with a program (not shown) stored in the memory 24. Respective functions of a receiving unit 30, a data acquiring unit 32, a print control unit 34, an address information acquiring unit 36, a file providing unit 38, and a data providing unit 40 are realized as a result of the CPU 22 executing processes in accordance with the program.

Configuration of Storage Administration Server 50 and Notification Administration Server 60

The storage administration server 50 and the notification administration server 60 are servers for mediating printing (in other words, print mediation servers) by the printer 10. The respective servers 50 and 60 are not servers provided by a vendor of the printer 10 but are servers provided by a company that provides a cloud printing service (hereinafter referred to as a "provider"). However, in a modification, the respective servers 50 and 60 may be servers provided by the vendor of the printer 10. In addition, while the servers 50 and 60 are configured separately in the present embodiment, the servers 50 and 60 may be integrally configured in a modification.

The storage administration server 50 stores data that is a print object (hereinafter, referred to as "print data") in a storage unit 56 in accordance with an instruction from the PC 80. Moreover, the storage unit 56 may be provided inside the storage administration server 50 or may be provided outside the storage administration server 50. In the latter case, the storage unit 56 may be rephrased as a "storage server".

The storage administration server 50 stores a printer administration table 52. In the printer administration table 52, a user ID, a printer name, and capability information are associated with each other. A user ID is an ID issued by the provider to a user desiring to use the cloud printing service. A printer name is a node name of a printer (for example, a name specified by the user of the printer). For example, the printer name of the printer 10 is "PN1". Capability information is information indicating a print condition that is executable by the printer.

Capability information, for example, includes the number of colors usable by a printer. In the example shown in FIG. 1, the number of colors usable by the printer 10 having the printer name "PN1" is "color", "gray", and "monochrome". This means that the printer 10 can execute all of color printing, gray scale printing, and monochrome printing. In addition, the capability information, for example, includes paper sizes usable by a printer. In the example shown in FIG. 1, the paper sizes usable by the printer 10 having the printer name "PN1" are "A4" and "B4". This means that the printer 10 can execute both printing on an A4 printing paper and printing on a B4 printing paper.

Moreover, the capability information is not limited to the number of colors and the paper sizes usable by the printer, and may alternatively include print resolutions, paper types (such as plain paper and glossy paper) and the like usable by the printer, information indicating an upper limit of the number of sets printable by the printer, or information indicating whether both-side printing is executable by the printer or not.

The storage administration server 50 further stores a job administration table 54. In the job administration table 54, a user ID and job information are associated with each other. The user ID is the same as the user ID used in the printer administration table 52. The job information will be described later in detail with reference to FIG. 4.

Moreover, when storing print data in the storage unit 56 in accordance with an instruction from a user having a specific user ID (for example, "U1") (that is, an instruction from a terminal device used by the user having the specific user ID), the storage administration server 50 provides a storage notification including the specific user ID to the notification administration server 60.

In a case where the notification administration server 60 acquires the storage notification including the specific user ID from the storage administration server 50, the notification administration server 60 transmits a predetermined notification to a printer (for example, the printer 10) for which an authentication using the specific user ID has succeeded. This will be described in detail later.

Configuration of Transformation Server 70

The transformation server 70 is a server provided by the vendor of the printer 10. However, in a modification, the transformation server 70 may be provided by an entity other than the vendor of the printer 10. The transformation server 70 stores a program which, for each of a plurality of types of file formats, converts data having one of the plurality of types of file formats into data having a specific file format. The specific file format is a format interpretable by the printer 10 (for example, PDF (Portable Document Format)).

In a case where print data is provided from the printer 10, the transformation server 70 uses the program for converting the file format of the print data (for example, DOC) into the specific file format to create transformed data having the specific file format from the print data. The transformation server then provides the transformed data to the printer 10.

Processes Executed by Respective Devices

Next, contents of processes executed by respective devices will be described with reference to FIG. 2. The printer 10 stores a web server program and is capable of functioning as a web server. In addition, the storage administration server 50 also stores a web server program and is also capable of functioning as a web server. On the other hand, the PC 80 stores a web browser program and is capable of functioning as a web client.

Process Related to Authentication

In a case where the user of the PC 80 desires to use the cloud printing service, the user performs an operation for accessing the web server of the printer 10 on an operating unit (not shown; for example, a keyboard or a mouse) of the PC 80. In this case, the PC 80 accesses the web server of the printer 10 by using a web browser. The web server of the printer 10 provides the PC 80 with screen data representing a login screen for inputting a user ID and a password. As a result, the login screen is displayed on a display unit (not shown) of the PC 80. The user performs an operation for inputting login information including a user ID "U1" and a password to the operating unit of the PC 80 while viewing the login screen. In this case, the PC 80 provides the login information to the printer 10.

In a case where the login information is acquired from the PC 80, the controller 20 of the printer 10 transmits the login information to the storage administration server 50. Moreover, an address of the storage administration server 50 is stored in advance in the memory 24 of the printer 10, and the controller 20 transmits the login information to the address as a destination.

Although not shown, the storage administration server 50 stores a user administration table, in which for each of a plurality of user IDs, the user ID and a password are associated with one another. In a case where the login information is received from the printer 10, the storage administration server 50 judges whether or not the user ID and the password included in the login information are included in the user administration table (that is, the storage administration server 50 executes authentication). In a case where the user ID and the password are included in the user administration table, the storage administration server 50 transmits success information indicating that the authentication has succeeded to the printer 10.

In a case where the success information is received from the storage administration server 50, the file providing unit 38 (refer to FIG. 1) of the printer 10 provides a specific file including the printer name "PN1" of the printer 10 and the capability information of the printer 10 (that is, information indicating every print condition executable by the printer 10) to the storage administration server 50. The specific file has an XPS (XML Paper Specification) format. However, in a modification, the Capability information may have a file format (for example, XML) that differs from XPS. Moreover, the specific file is stored in advance in the memory 24 of the printer 10. The file providing unit 38 acquires the specific file from the memory 24 and provides the storage administration server 50 with the specific file.

Moreover, as above mentioned, for example, the number of colors usable by the printer 10 includes "color", "gray", and "monochrome". Therefore, the capability information of the printer 10 indicates a plurality of print conditions ("color", "gray", and "monochrome") corresponding to the number of colors. In addition, the capability information of the printer 10 indicates a plurality of print conditions ("A4" and "B4") corresponding to paper sizes.

In a case where the specific file is acquired from the printer 10, the storage administration server 50 registers an association of the user ID "U1", the printer name "PN1" included in the specific file, and the capability information included in the specific file to the printer administration table 52.

The controller 20 of the printer 10 further transmits the login information to the notification administration server 60. Moreover, an address of the notification administration server 60 is stored in advance in the memory 24 of the printer 10, and the controller 20 transmits the login information to the address as the destination.

Although not shown, the notification administration server 60 stores a user administration table in the same manner as the storage administration server 50. In a case where the login information is received from the printer 10, the notification administration server 60 executes an authentication similar to that executed by the storage administration server 50 and transmits success information indicating that the authentication has succeeded to the printer 10.

In a case where the success information is received from the notification administration server 60, the printer 10 establishes a TCP communication session between the printer 10 and the notification administration server 60. A status in which the communication session is being established or, in other words, a status in which an XMPP (eXtensible Messaging and Presence Protocol) stream is being opened is maintained between the printer 10 and the notification administration server 60 until power of the printer 10 is turned off. Moreover, a status in which the communication session is being established is not maintained between the printer 10 and the storage administration server 50 and a communication session is established between the printer 10 and the storage administration server 50 when job information and the like (to be described later) is communicated between the printer 10 and the storage administration server 50.

Print Instruction from PC 80 to Storage Administration Server 50

In a case where the user of the PC 80 desires to cause the printer 10 to perform printing, the user performs an operation for accessing the web server of the storage administration server 50 on the operating unit of the PC 80. In this case, the PC 80 accesses the web server of the storage administration server 50 by using a web browser. In the same manner as the case with the web server of the printer 10, screen data representing a login screen is provided to the PC 80 from the storage administration server 50 and the login screen is displayed on the display unit of the PC 80. The user performs an operation for inputting login information including the user ID "U1" and the password to the operating unit of the PC 80 while viewing the login screen. In this case, the PC 80 provides the login information to the storage administration server 50. Moreover, in the present embodiment, while a terminal device that transmits login information to the printer 10 and a terminal device that transmits login information to the storage administration server 50 are the same (that is, the PC 80), the former terminal device and the latter terminal device may differ from each other.

In a case where login information is acquired from the PC 80, the storage administration server 50 executes the same authentication as described above. Next, in a case where the authentication succeeds, the storage administration server 50 creates screen data representing a print setting screen. The print setting screen includes a printer selection screen and a print condition selection screen.

Specifically, the storage administration server 50 first identifies printer names "PN1" and "PN2" associated with the user ID "U1" included in the login information from the printer administration table 52, and creates the screen data representing the printer selection screen including the printer names "PN1" and "PN2". The storage administration server 50 then provides the screen data to the PC 80. As a result, the printer selection screen is displayed on the display unit of the PC 80. The user selects the printer name "PN1" of the printer 10 to execute the printing from the printer names "PN1" and "PN2" while viewing the printer selection screen. In this case, the PC 80 provides selection result information including the printer name "PN1" to the storage administration server 50.

In a case where selection result information including the printer name "PN1" is acquired, the storage administration server 50 identifies the capability information associated with the user ID "U1" and the printer name "PN1" from the printer administration table 52 and creates screen data representing a print condition selection screen including the capability information. As above mentioned, the capability information of the printer 10 has an XPS format. Therefore, the storage administration server 50 uses software (an XPS Viewer) for interpreting data in the XPS format to interpret the Capability information of the printer 10 to create the screen data. Subsequently, the storage administration server 50 provides the PC 80 with the screen data.

As a result, the print condition selection screen is displayed on the display unit of the PC 80. The user selects a desired print condition from the plurality of print conditions while viewing the print condition selection screen. For example, the user selects a single print condition (for example, "monochrome") corresponding to a number of colors from the plurality of print conditions ("color", "gray", and "monochrome") corresponding to the number of colors, and selects a single print condition (for example, "A4") corresponding to a paper size from the plurality of print conditions ("A4" and "B4") corresponding to paper sizes. As shown, in the present embodiment, since the printer 10 provides the capability information to the storage administration server 50, the user of the PC 80 is capable of selecting a desired print condition from a plurality of print conditions executable by the printer 10. The PC 80 provides the storage administration server 50 with condition data CD1 indicating the print condition (for example, "monochrome" or "A4") selected by the user. Moreover, the condition data CD1 may also be referred to as a "print ticket".

In the present embodiment, the condition data CD1 is an XPS file. That is, a file format of the condition data CD1 and the file format of the Capability information are identical. Since an identical file format is used in this manner, as long as the storage administration server 50 comprises software for interpreting data in the XPS format, the storage administration server 50 is capable of creating condition data CD1 (XPS file) to be stored in the storage unit 56 by using condition data CD1 (XPS file) acquired from the PC 80 as well as creating screen data representing a print condition selection screen by using the capability information. Volume of the program that the storage administration server 50 must comprise can be reduced compared to a case where the file format of the condition data CD1 and the file format of the capability information are different.

Furthermore, for example, the user of the PC 80 can select a file stored in the PC 80 as a print object or select a file existing outside of the PC 80 (for example, a file stored in a server on the Internet) as the print object. In the former case, the PC 80 provides print data PD1 to the storage administration server 50. In the latter case, for example, the PC 80 may acquire print data PD1 from the outside of the PC 80 and provide the print data PD1 to the storage administration server 50, or may instruct a server storing the print data PD1 to provide the print data PD1 to the storage administration server 50. Moreover, in a modification, the user of the PC 80 may select a file stored in the storage administration server 50 as the print object.

Moreover, in the present embodiment, the print data PD1 is a PDF file. However, in a modification, the print data PD1 may have a file format other than PDF (for example, JPEG, DOC, or XPS). As above mentioned, in the present embodiment, the file format (PDF) of the print data PD1 and the file format (XPS) of the condition data CD1 are different. Supposing that a configuration is adopted in which the storage administration server 50 only accepts print data having the same file format as the file format (XPS) of the condition data CD1, only printing of an XPS file is realized and printing of files in other formats cannot be realized. In the present embodiment, since the storage administration server 50 accepts the print data PD1 having the file format that differs from the file format (XPS) of the condition data CD1, printing in various file formats is realized.

As described above, the storage administration server 50 acquires the printer name "PN1", the print data PD1, and the condition data CD1. In this case, the storage administration server 50 executes a storage process (S10). That is, the storage administration server 50 executes the storage process in accordance with an instruction from the PC 80.

Contents of Storage Process: S10

In the storage process, the storage administration server 50 stores the PDF file including the print data PD1 and the XPS file including the condition data CD1 in the storage unit 56 (refer to FIG. 1). That is, the storage administration server 50 stores two separate files in the storage unit 56. Therefore, a URL (Uniform Resource Identifier) indicating a storage address of the print data PD1 in the storage unit 56 is different from a URL indicating a storage address of the condition data CD1 in the storage unit 56.

In the storage process, the storage administration server 50 further registers an association of the user ID "U1" included in the login information acquired from the PC 80 and job information J1 corresponding to the print data PD1 newly stored in the storage unit 56 to the job administration table 54. Moreover, in the job administration table 54, a plurality of job information may potentially be registered in association with a single user ID. For example, as shown in FIG. 1, an association of the user ID "U1" and a plurality of job information J1 and J2 is registered in the job administration table 54. For example, the job information J2 is information registered in the job administration table 54 according to an instruction from the PC 80 or another PC before registration of the job information J1 in the job administration table 54.

Figure 4:
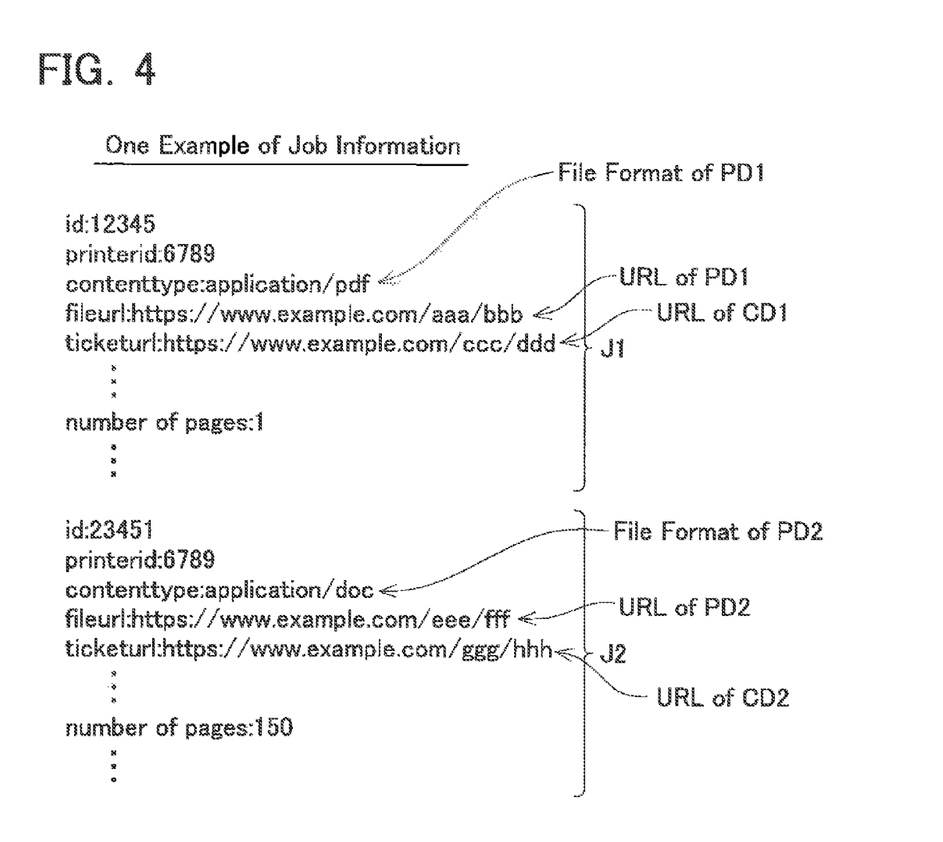
FIG. 4 shows a flow chart of a print administration process.

As shown in FIG. 4, the job information J1 includes a job ID "12345", a printer ID "6789", a file format "PDF" of the print data PD1, a URL of the print data PD1 (a URL in the storage unit 56), a URL of the condition data CD1 (a URL in the storage unit 56), and the number of printed pages "1".

The job ID is an ID for identifying individual print jobs (in other words, an ID for identifying individual print data stored in the storage unit 56). The printer ID is an ID for identifying a printer. Although not shown, the storage administration server 50 stores an association of a printer name and a printer ID. Therefore, once the printer name "PN1" of the printer 10 is acquired from the PC 80, the storage administration server 50 is capable of identifying the printer ID "6789" of the printer 10. In addition, the storage administration server 50 is capable of identifying a file format of the print data PD1 based on an extension of the file name of the print data PD1. The number of printed pages is the number of pages in the print data PD1. Moreover, the job information J2 has the same configuration as the job information J1.

Figure 2:
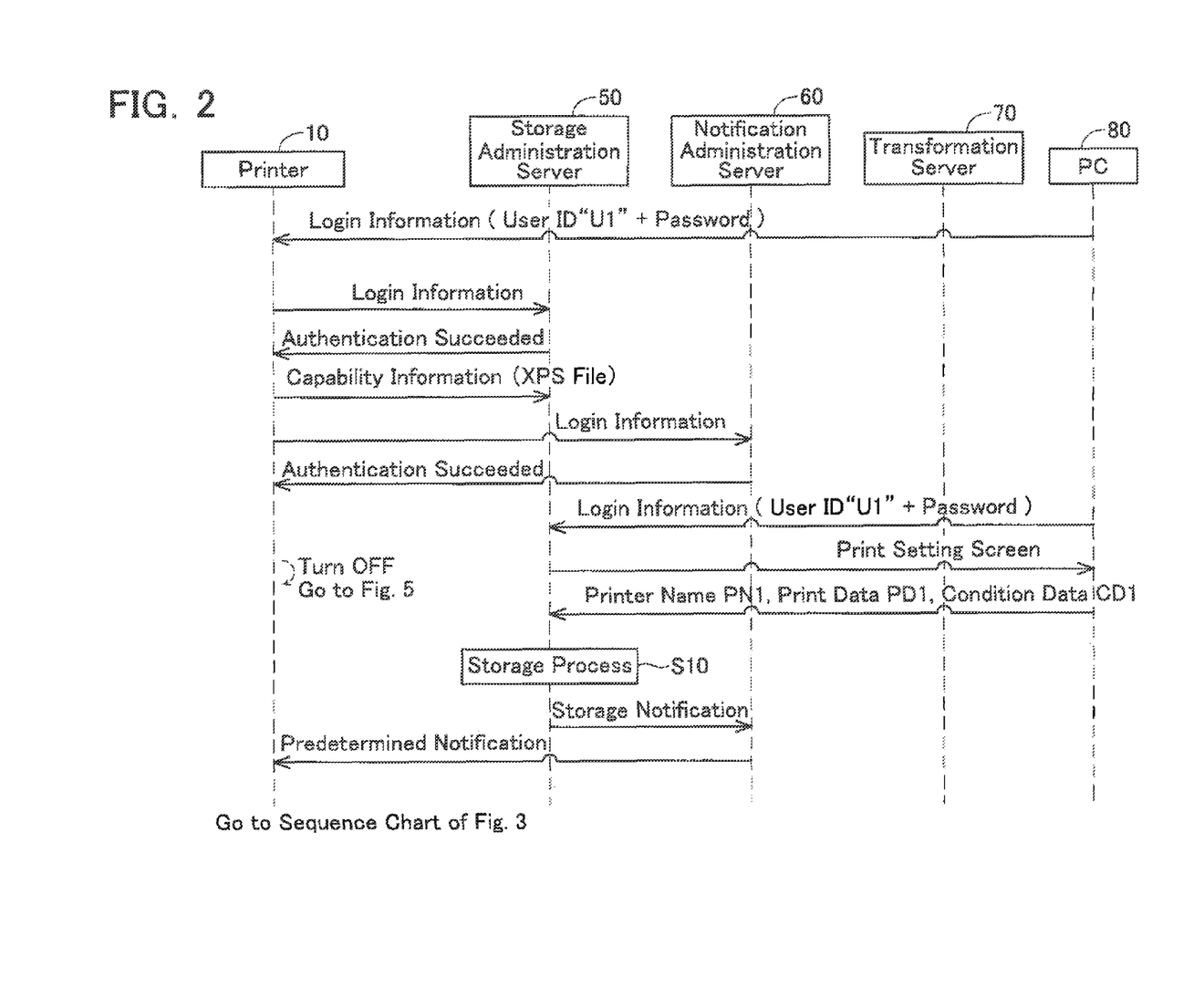
FIG. 2 shows a sequence diagram of an example of communication executed among respective devices.

As shown in FIG. 2, once the storage process (S10) is concluded, the storage administration server 50 provides the storage notification including the user ID "U1" to the notification administration server 60. Therefore, by acquiring the storage notification, the notification administration server 60 is able to know that the storage process had been executed according to the instruction from the user having the user ID "U1". In this case, the notification administration server 60 transmits the predetermined notification to the printer 10 for which the authentication of the login information including the user ID "U1" had succeeded. As above mentioned, the status in which the communication session is being established is maintained between the notification administration server 60 and the printer 10. The notification administration server 60 transmits the predetermined notification to the printer 10 using the communication session. Moreover, the predetermined notification may also be referred to as the "XMPP notification".

Respective Processes Subsequent to Storage Notification

Figure 3:
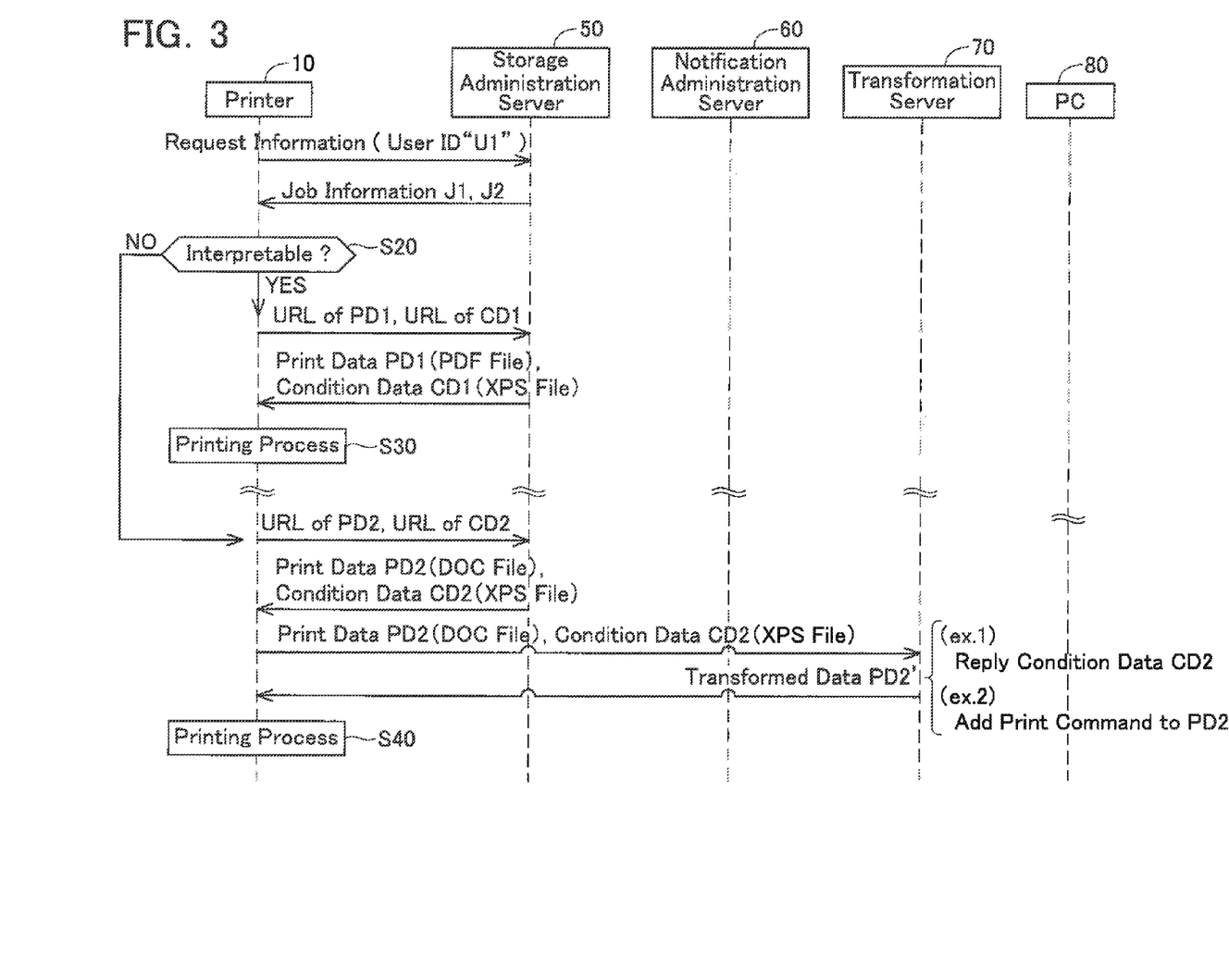
FIG. 3 shows a sequence diagram that is a continuation of FIG. 2.

The receiving unit 30 (refer to FIG. 1) of the printer 10 receives the predetermined notification from the notification administration server 60. In this case, as shown in FIG. 3, the address information acquiring unit 36 (refer to FIG. 1) provides request information including the user ID "U1" to the storage administration server 50. In this case, the storage administration server 50 identifies the job information J1 and J2 associated with the user ID "U1" included in the request information from the job administration table 54 and transmits the job information J1 and J2 to the printer 10. As a result, the address information acquiring unit 36 acquires the job information J1 and J2 from the storage administration server 50. Moreover, the job information J1 and J2 may also be referred to as "Fetch information".

Next, in S20, the print control unit 34 (refer to FIG. 1) identifies the file format "PDF" of the print data PD1 from the job information J1 and judges whether the file format "PDF" of the print data PD1 is interpretable or not. In the present embodiment, the print control unit 34 can interpret PDF data. Therefore, the print control unit 34 makes a judgment of YES in S20.

In a case of YES in S20, the data acquiring unit 32 (refer to FIG. 1) identifies a URL of the print data PD1 from the job information J1 and acquires the PDF file including the print data PD1 from the storage unit 56 using the URL. Specifically, the data acquiring unit 32 transmits a data acquisition request to the URL of the print data PD1 as a destination. As a result, the storage unit 56 transmits the PDF file including the print data PD1 to the printer 10. Accordingly, the data acquiring unit 32 is capable of acquiring the print data PD1. Moreover, in the example shown in FIG. 3, the storage unit 56 is provided inside the storage administration server 50 and the data acquiring unit 32 acquires the print data PD1 from the storage administration server 50. However, as above mentioned, the storage unit 56 may be provided outside the storage administration server 50. In this case, the data acquiring unit 32 acquires the print data PD1 from the storage unit 56 outside the storage administration server 50.

The data acquiring unit 32 then identifies the URL of the condition data CD1 from the job information J1 and acquires the XPS file including the condition data CD1 from the storage unit 56 by using the URL. Specifically, in the same manner as in the case of the print data PD1, the data acquiring unit 32 transmits a data acquisition request to the URL of the condition data CD1 as the destination and acquires the condition data CD1.

Next, in S30, the print control unit 34 causes the print executing unit 16 to execute printing of the image represented by the print data PD1 included in the PDF file according to the print condition (hereinafter referred to as "selected print condition") indicated by the condition data CD1 included in the XPS file. Specifically, the print control unit 34 first creates data conforming to the selected print condition by using the print data PD1. For example, in a case where the print data PD1 is color data and the selected print condition indicates monochrome, the print control unit 34 transforms print data PD1 that is color data into monochrome data. Furthermore, at the same time, the print control unit 34 creates monochrome data conforming to the paper size (for example, "A4") indicated by the selected paper condition. In addition, the print control unit 34 causes the print executing unit 16 to execute printing in accordance with the monochrome data. In this example, the user can obtain an A4-size printing medium on which a monochrome image has been printed.

As described earlier, in addition to the job information J1, the address information acquiring unit 36 also acquires the job information J2 from the storage administration server 50. Once the print process (S30) in accordance with the job information J1 is completed, the print control unit 34 (refer to FIG. 1) once again executes S20 to identify the file format "DOC" of the print data PD2 from the job information J2 and judges whether the file format "DOC" of the print data PD2 is interpretable or not. In the present embodiment, the print control unit 34 cannot interpret DOC data. Therefore, the print control unit 34 makes a judgment of NO in S20.

In a case of NO in S20, in the same manner as in the case of the job information J1, the data acquiring unit 32 uses the two URLs included in the job information J2 to acquire a DOC file including the print data PD2 and an XPS file including the condition data CD2 from the storage unit 56. Next, the data providing unit 40 provides the transformation server 70 with the DOC file including the print data PD2 and the XPS file including the condition data CD2.

The transformation server 70 transforms the print data PD2 into PDF and creates transformed data PD2'. The transformation server 70 provides the printer 10 with a PDF file including the transformed data PD2'. Accordingly, the data acquiring unit 32 is capable of acquiring a PDF file including the transformed data PD2'.

Moreover, in a first example, the transformation server 70 returns the XPS file including the condition data CD2 acquired from the printer 10 without modification to the printer 10. Accordingly, the data acquiring unit 32 is capable of acquiring not only the PDF file including the transformed data PD2' but also the XPS file including the condition data CD2. In this case, in S40, the print control unit 34 causes the print executing unit 16 to execute printing of an image represented by the print data PD2' included in the PDF file according to the print condition indicated by the condition data CD2 included in the XPS file acquired from the transformation server 70. Moreover, the process of S40 is the same as the process of S30.

In addition, in a second example, the transformation server 70 adds a print command (for example, number of colors=monochrome or paper size=A4) corresponding to the print condition indicated by the condition data CD2 acquired from the printer 10 to the transformed data PD2'. In this case, the transformation server 70 provides the printer 10 with a PDF file including the transformed data PD2' and the print command. Accordingly, the data acquiring unit 32 acquires a PDF file including the transformed data PD2' and the print command. In this case, in S40, the print control unit 34 causes the print executing unit 16 to execute printing of an image represented by the print data PD2' according to the print condition indicated by the print command.

Even in a case where the print data PD2 is not interpretable by the printer 10, the printer 10 is capable of executing printing by using the transformed data PD2' created by the transformation server 70. That is, the printer 10 is capable of appropriately executing printing of an image that is desired by the user.

In addition, supposing that a configuration is adopted in which the printer 10 does not provide the condition data CD2 to the transformation server 70 and only provides the print data PD2 to the transformation server 70, the printer 10 must continue storing (in other words, administrating) the condition data CD2 until printing is executed using the transformed data PD2'. In contrast, according to the first example, since the printer 10 is capable of providing the condition data CD2 to the transformation server 70 and acquiring the condition data CD2 from the transformation server 70, the printer 10 need not continue storing the condition data CD2. Furthermore, the second example also does not require the printer 10 to continue storing the condition data CD2. Particularly, in the second example, the condition data CD2 is interpretable by the transformation server 70 even if the condition data CD2 is not interpretable by the printer 10. Therefore, the transformation server 70 is capable of using the condition data CD2 to create a print command that is interpretable by the printer 10 and add the print command to the transformed data PD2'. As a result, the printer 10 is capable of executing printing of an image represented by the transformed data PD2' according to the print command attached to the transformed data PD2'.

In Case Where Power of Printer 10 is Turned Off/On

As shown in FIG. 2, let us assume a situation where power of the printer 10 is turned off before the printer 10 receives the predetermined notification from the notification administration server 60. In this case, the printer 10 is unable to receive the predetermined notification from the notification administration server 60 and, as a result, cannot be informed that a storage process has been executed. Therefore, in the present embodiment, the following configuration is adopted for the printer 10.

Figure 5:
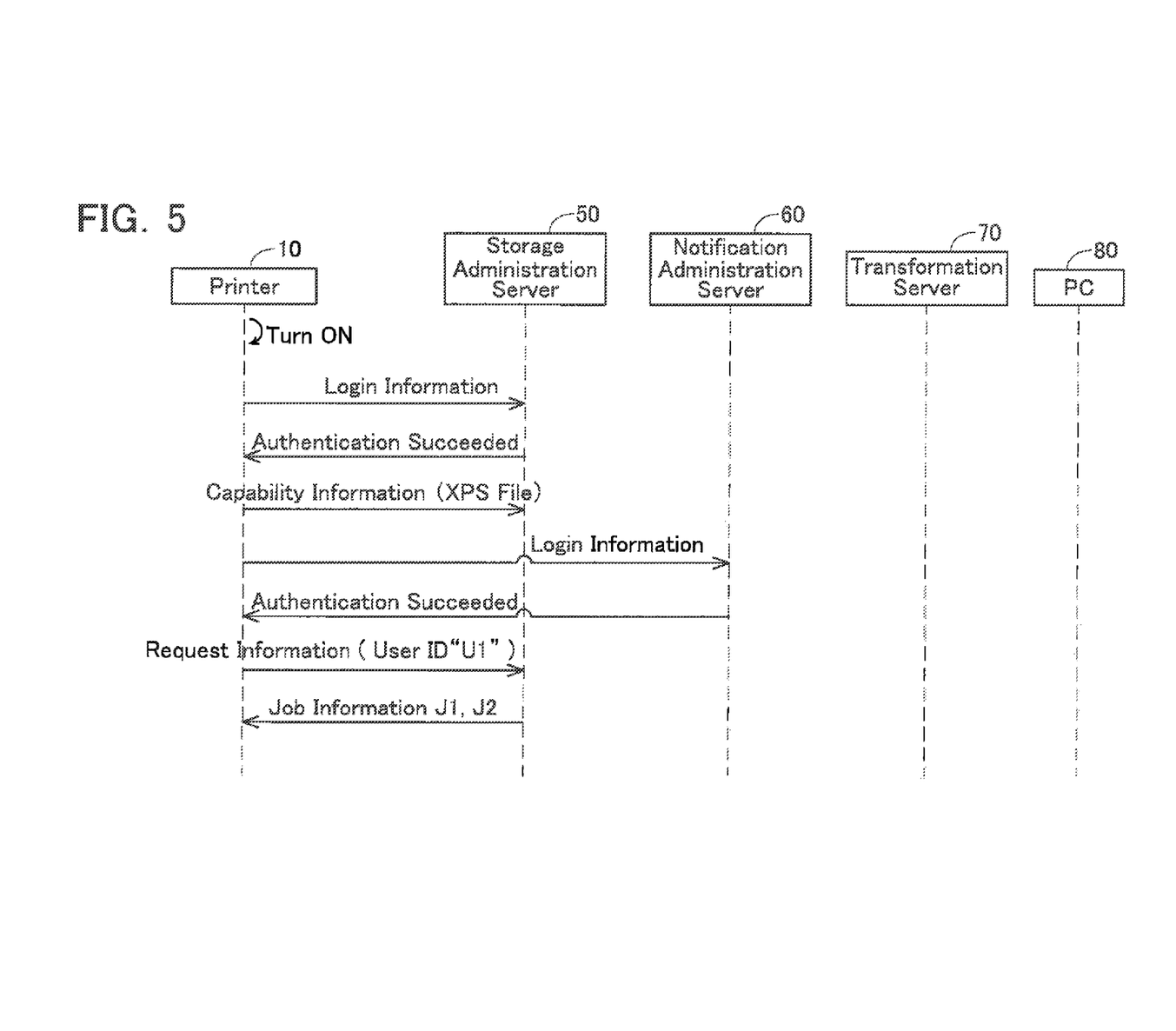

That is, as shown in FIG. 5, in a case where the power of the printer 10 is turned on, the controller 20 of the printer 10 executes the process for the authentication (transmission of the login information to the respective servers 50 and 60) by using the login information acquired before the power had been turned off. Furthermore, the file providing unit 38 of the printer 10 provides the capability information of the printer 10 to the storage administration server 50 in the same manner as above mentioned.

Next, the address information acquiring unit 36 provides request information including the user ID "U1" to the storage administration server 50 even if the predetermined notification is not received from the notification administration server 60. As a result, the address information acquiring unit 36 is capable of acquiring the job information J1 and J2 from the storage administration server 50 even if the predetermined notification is not received from the notification administration server 60. Subsequent processes are the same as those shown in FIG. 3. According to this configuration, even if a state occurs in which the print data PD1 and the condition data CD1 are stored in the storage unit 56 while the power of the printer 10 is turned off, the printer 10 is capable of acquiring the job information J1 (that is, the URL of the print data PD1 and the URL of the condition data CD1) from the storage administration server 50 and, as a result, the printer 10 is capable of appropriately acquiring the print data PD1 and the condition data CD1.

Advantageous Effect of Present Embodiment

By utilizing the communication system 2 according to the present embodiment, even if the PC 80 does not comprise a printer driver for causing the printer 10 to execute printing, the PC 80 is capable of issuing an instruction (the printer name PN1, the print data PD1, the condition data CD1) for causing the printer 10 to execute printing to the storage administration server 50 by using the web browser. In addition, in the case where the predetermined notification is received from the notification administration server 60, the printer 10 is capable of executing printing in accordance with the print data PD1. That is, in the present embodiment, even if the PC 80 does not comprise the printer driver, the PC 80 is capable of causing the printer 10 to execute printing by using a print mediation server (the storage administration server 50 and the notification administration server 60). That is, the PC 80 is capable of utilizing a cloud printing service.

According to the configuration described above, the user is capable of selecting the print data PD1 that is the print object and the desired print condition on the PC 80. In this case, according to the instruction from the PC 80, the storage administration server 50 causes the storage unit 56 to store the PDF file including the print data PD1 and the XPS file including the condition data CD1. That is, the storage administration server 50 causes the storage unit 56 to store separate files. Supposing that a configuration is adopted in which the storage administration server 50 causes the storage unit 56 to store only a single file including the print data PD1 embedded with the condition data CD1, the storage administration server 50 must comprise a dedicated program for embedding condition data into print data. In particular, in a case where a plurality of types of file formats exists as print data file formats, a plurality of types of dedicated programs for the plurality of types of file formats is required. In contrast, in the present embodiment, the storage administration server 50 causes the storage unit 56 to store the print data PD1 and the condition data CD1 as separate files. Therefore, the storage administration server 50 need not comprise the dedicated program for embedding the condition data into the print data.

Once the print data PD1 and the condition data CD1 are stored in the storage unit 56, the printer 10 receives the predetermined notification from the notification administration server 60 and acquires the job information J1 from the storage administration server 50. The printer 10 uses the two URLs included in the job information J1 to acquire the PDF file including the print data PD1 and the XPS file including the condition data CD1 from the storage unit 56. According to this configuration, in the case where the print data PD1 and the condition data CD1 are separate files, the printer 10 is capable of appropriately acquiring the print data PD1 and the condition data CD1. In particular, even in the case where the file format (PDF) of the print data PD1 and the file format (XPS) of the condition data CD1 are different, the printer 10 is capable of appropriately acquiring the print data PD1 and the condition data CD1.

In addition, the printer 10 causes the print executing unit 16 to execute printing of the image represented by the print data PD1 according to the print condition indicated by the condition data CD1. That is, the printer 10 is capable of executing printing of the image according to the print condition desired by the user. Therefore, the printer 10 is capable of providing the user with the appropriate print result that is desired by the user.

Correspondence Relationship

The print data PD1 and the condition data CD1 are, respectively, examples of "specific print data" and "specific condition data". The PDF file including the print data PD1 and the XPS file including the condition data CD1 are, respectively, examples of "first file" and "second file", and the URLs of the files are, respectively, examples of "first address information" and "second address information". In addition, the capability information of the printer 10 is an example of "executable data", and the XPS file including the capability information is an example of "third file".

(Modification 1) The servers 50 and 60 need not be configured separately as in the embodiment described above and may alternatively be configured integrally. Generally, "print mediation server" may be realized by a single device or by a plurality of devices.

(Modification 2) In the embodiment described above, the print data PD1 and the condition data CD1 are stored in the storage unit 56 as separate files. Alternatively, only a single file including the print data PD1 embedded with the condition data CD1 may be stored in the storage unit 56. In this case, the address information acquiring unit 36 may acquire single address information (for example, a URL) indicating a storage address of the single file and acquire the single file using the single address information.

(Modification 3) In the embodiment described above, in a case where print data is not interpretable by the print control unit 34 (in other words, in a case of NO in S20 in FIG. 3), the data providing unit 40 always provides the transformation server 70 with the print data. However, in a case where the print data is not interpretable by the print control unit 34, the data providing unit 40 may provide the transformation server 70 with the print data in a case where the number of printed pages (which is identifiable from the job information J1 and J2) of the print data is equal to or smaller than a predetermined number (for example, 10 pages), and may not provide the transformation server 70 with the print data in a case where the number of printed pages of the print data is greater than the predetermined number. In the latter case, the printer 10 may transmit information indicating an error to the storage administration server 50 without executing printing in accordance with the print data. According to this configuration, a situation can be avoided in which the user is kept waiting for a long time due to the data conversion by the transformation server 70 taking a long time.

(Modification 4) In the embodiment described above, the address information acquiring unit 36 provides the storage administration server 50 with request information including the user ID "U1" to acquire the job information J1 and J2. Alternatively, the following configuration may be adopted. That is, when the storage administration server 50 receives the login information from the printer 10 and transmits the success information indicating that the authentication has succeeded to the printer 10, the storage administration server 50 creates an AuthToken and transmits the AuthToken to the printer 10. The storage administration server 50 stores an association of the user ID "U1" and the AuthToken. In addition, in a case where the predetermined notification is received from the notification administration server 60, the address information acquiring unit 36 provides request information including the AuthToken to the storage administration server 50. In this case, the storage administration server 50 identifies the user ID "U1" associated with the AuthToken, and then transmits the job information J1 and J2 associated with the user ID "U1" to the printer 10. That is, the address information acquiring unit 36 provides the storage administration server 50 with the request information including the AuthToken to acquire the job information J1 and J2. Generally, the address information acquiring unit may provide the print mediation server with relative information (for example, a user ID itself (embodiment) or an AuthToken (present modification)) related to account information (for example, a user ID) to acquire address information.

(Modification 5) In the embodiment described above, the PC 80 accesses the storage administration server 50 by using the web browser and transmits the print data PD1, the condition data CD1, and the like to the storage administration server 50 (refer to FIG. 2). Alternatively, the PC 80 may transmit the print data PD1, the condition data CD1, and the like to the storage administration server 50 by using a dedicated program for accessing the storage administration server 50 (instead of a web browser, for example, a program prepared by a provider of the storage administration server 50 or a program provided by the vendor or the like of the printer 10).

(Modification 6) "Printer" need not be limited to a device comprising only a print function and may alternatively be a device comprising another function (a scan function, a copy function, a FAX function, a phone function, and the like). In other words, the term "printer" encompasses a copying machine, a FAX machine, a multi-function device (a device at least comprising a print function and another function), and the like.

(Modification 7) The term "terminal device" is not limited to a PC and encompasses a mobile phone, a PDA, a scanner, a multi-function device, and the like.

(Modification 8) In the foregoing embodiment, the receiving unit 30, the data acquiring unit 32, the print control unit 34, the address information acquiring unit 36, the file providing unit 38, and the data providing unit 40 are realized as a result of the controller 20 executing the processes according to the program in a memory 24. Nevertheless, at least one unit of respective units 30 to 40 may alternately be realized by a hardware resource such as a logic circuit.

What is claimed is:

1. A printer configured to be connected with a print mediation server through the Internet, the printer comprising:
   a processor; and
   a memory storing computer-readable instructions therein, the computer-readable instructions, when executed by the processor, causing the printer to perform:
   acquiring authentication information from a terminal device;
   executing an authentication, using the acquired authentication information, with the print mediation server mediating a printing according to a print instruction from the terminal device;
   causing the printer operate in a print mode in a case where the authentication being succeeded, wherein the print mode is a mode capable of acquiring from the print mediation server specific print data and specific condition data indicating a specific print condition;
   acquiring, from the print mediation server, the specific print data and the specific condition data during the printer being operated in the print mode; and
   causing a print executing unit to execute printing of an image represented by the specific print data according to the specific print condition indicated by the specific condition data.

2. The printer as in claim 1, wherein
the computer-readable instructions, when executed by the processor, cause the printer to further perform:
receiving a predetermined notification from the print mediation server during the printer is operated in the print mode, wherein the predetermined notification is a notification to be sent to the printer by the print mediation server when the print mediation server has stored the specific print data and the specific condition data in a storage unit according to an instruction from the terminal device; and
acquiring from the print mediation server address information indicating a storage address of the specific print data and the specific condition data in the storage unit in a case where the predetermined notification is received,
wherein the acquiring the specific print data and the specific condition data includes acquiring the specific print data and the specific condition data from the storage unit by using the address information.

3. The printer as in claim 2, wherein
the acquiring the address information includes acquiring, even if the predetermined notification is not received, the address information from the print mediation server in a case where the printer is turned on.

4. The printer as in claim 3, wherein
the executing the authentication includes executing, using the authentication information acquired before the printer is turned off, with the print mediation server in the case where the printer is turned on.

5. The printer as in claim 1, wherein
the computer-readable instructions, when executed by the processor, cause the printer to further perform:
providing executable data indicating a plurality of print conditions executable by the printer to the print mediation server,
wherein the specific print condition is a print condition selected from among the plurality of print conditions indicated by the executable data.

6. The printer as in claim 1, wherein
the computer-readable instructions, when executed by the processor, cause the printer to further perform:
establishing a communication session between the printer and the print mediation server in the case where the authentication is succeeded,
wherein the print mode is a mode for maintaining the communication session established.

7. The printer as in claim 1, wherein
the causing the print executing unit to execute includes causing the print executing unit to execute printing of the image represented by the specific print data according to the specific print condition indicated by the specific condition data in a first case where the specific print data has a data format interpretable by the printer,
wherein the computer-readable instructions, when executed by the processor, cause the printer to further perform:
providing the specific print data to a transformation server so as to acquire transformed data from the transformation server in a second case where the specific print data does not have the data format interpretable by the printer, wherein the transformation server creates, by transforming the specific print data, the transformed data having the data format interpretable by the printer, and the causing the print executing unit to execute includes causing the print executing unit to execute printing of an image represented by the transformed data according to the specific print condition indicated by the specific condition data in the second case.

8. The printer as in claim 1, wherein the computer-readable instructions, when executed by the processor, cause the printer to further perform:

acquiring, from the print mediation server, address information indicating a storage address of the specific print data and the specific condition data in the storage unit in a case where the predetermined notification is received, wherein the acquiring the specific print data and the specific condition data includes acquiring the specific print data and the specific condition data from the storage unit by using the address information.

9. A non-transitory computer-readable medium storing computer-readable instructions for a printer configured to be connected with a print mediation server through the Internet, wherein the computer-readable instructions, when executed by a controller mounted on the printer, cause the printer to perform:

acquiring authentication information from a terminal device;

executing an authentication, using the acquired authentication information, with the print mediation server mediating a printing according to a print instruction from the terminal device;

causing the printer operate in a print mode in a case where the authentication being succeeded, wherein the print mode is a mode capable of acquiring from the print mediation server specific print data and specific condition data indicating a specific print condition;

acquiring, from the print mediation server, the specific print data and the specific condition data during the printer being operated in the print mode; and causing a print executing unit to execute printing of an image represented by the specific print data according to the specific print condition indicated by the specific condition data.

\* \* \* \* \*